United States Patent
Han et al.

(10) Patent No.: US 12,421,143 B2
(45) Date of Patent: Sep. 23, 2025

(54) COOPERATIVE OPTIMAL CONTROL METHOD AND SYSTEM FOR WASTEWATER TREATMENT PROCESS

(71) Applicant: BEIJING UNIVERSITY OF TECHNOLOGY, Beijing (CN)

(72) Inventors: Honggui Han, Beijing (CN); Lu Zhang, Beijing (CN); Junfei Qiao, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 863 days.

(21) Appl. No.: 17/691,096

(22) Filed: Mar. 9, 2022

(65) Prior Publication Data
US 2022/0194830 A1    Jun. 23, 2022

Related U.S. Application Data

(63) Continuation-in-part of application No. 16/109,651, filed on Aug. 22, 2018, now abandoned.

(51) Int. Cl.
C02F 3/00      (2023.01)
C02F 3/02      (2023.01)
G05B 13/04     (2006.01)

(52) U.S. Cl.
CPC ............. *C02F 3/006* (2013.01); *C02F 3/02* (2013.01); *G05B 13/048* (2013.01);
(Continued)

(58) Field of Classification Search
CPC ...... C02F 3/006; C02F 3/02; C02F 2209/006; C02F 2209/10; C02F 2209/14;
(Continued)

(56) References Cited

U.S. PATENT DOCUMENTS

| | | | | |
|---|---|---|---|---|
| 2016/0123949 A1* | 5/2016 | Han | ............. | G06N 3/088 702/25 |
| 2018/0164272 A1* | 6/2018 | Han | ............. | G06N 3/088 |
| 2020/0385286 A1* | 12/2020 | Han | ............. | G06Q 50/06 |

FOREIGN PATENT DOCUMENTS

| | | | | |
|---|---|---|---|---|
| CN | 102161551 A | * | 8/2011 | |
| CN | 108074011 A | * | 5/2018 | ............. G06Q 50/26 |
| CN | 110032755 A | * | 7/2019 | ............. G06N 3/006 |

OTHER PUBLICATIONS

Han, Hong-Gui, Lu Zhang, Lin-Lin Zhang, Zheng He, and Jun-Fei Qiao. "Cooperative optimal controller and its application to activated sludge process." IEEE Transactions on Cybernetics 51, No. 8 (2019): 3938-3951. (Year: 2019).*

(Continued)

*Primary Examiner* — Emerson C Puente
*Assistant Examiner* — Daniel E Miller
(74) *Attorney, Agent, or Firm* — J.C. PATENTS (57) ABSTRACT

In a cooperative optimal control system, firstly, two-level models are established to capture the dynamic features of different time-scale performance indices. Secondly, a data-driven assisted model based cooperative optimization algorithm is developed to optimize the two-level models, so that the optimal set-points of dissolved oxygen and nitrate nitrogen can be acquired. Thirdly, a predictive control strategy is designed to trace the obtained optimal set-points of dissolved oxygen and nitrate nitrogen. This proposed cooperative optimal control system can effectively deal with the difficulties of formulating the dynamic features and acquiring the optimal set-points.

1 Claim, 6 Drawing Sheets

(52) U.S. Cl.
CPC .... *C02F 2209/006* (2013.01); *C02F 2209/10* (2013.01); *C02F 2209/14* (2013.01); *C02F 2209/15* (2013.01); *C02F 2209/22* (2013.01); *Y02W 10/10* (2015.05)

(58) Field of Classification Search
CPC ............. C02F 2209/15; C02F 2209/22; G05B 13/048; Y02W 10/10
See application file for complete search history.

(56) References Cited

OTHER PUBLICATIONS

Kaelin, D., L. Rieger, J. Eugster, K. Rottermann, C. Bänninger, and H. Siegrist. "Potential of in-situ sensors with ion-selective electrodes for aeration control at wastewater treatment plants." Water Science and Technology 58, No. 3 (2008): 629-637. (Year: 2008).*

Cakici, A., and M. Bayramoğlu. "An approach to controlling sludge age in the activated sludge process." Water Research 29, No. 4 (1995): 1093-1097. (Year: 1995).*

Ingildsen, P. "Realising full-scale control in wastewater treatment systems using in situ nutrient sensors". [Doctoral Thesis (Lund University, 2002), Division for Industrial Electrical Engineering and Automation]. IEA, LTH, Box 118, SE-221 00 Lund, Sweden (Year: 2002).*

Choiński, Dariusz, Witold Nocoń, and Mieczyslaw Metzger. "Hybrid control system for pilot wastewater treatment plant." IFAC Proceedings vols. 39, No. 21 (2006): 226-231. (Year: 2006).*

Alex, Jens, Lorenzo Benedetti, J. B. Copp, K. V. Gernaey, Ulf Jeppsson, Ingmar Nopens, Marie-Noelle Pons et al. "Benchmark simulation model No. 1 (BSM1)." Report by the IWA Taskgroup on benchmarking of control strategies for WWTPs 1 (2008). (Year: 2008).*

Martín, José M., Pastora Vega, and Silvana Revollar. "Set-point optimization for enhancing the MPC control of the N-removal process in WWTP's." In World Automation Congress 2012, pp. 1-6. IEEE, 2012. (Year: 2012).*

* cited by examiner

COOPERATIVE OPTIMAL CONTROL METHOD AND SYSTEM FOR WASTEWATER TREATMENT PROCESS

CROSS REFERENCE TO RELATED APPLICATION

This application is a continuation-in-part of application Ser. No. 16/109,651 filed on Aug. 22, 2018, which claims priority to Chinese Patent Application No. 201810499231.X, filed on May 23, 2018, entitled "Cooperative optimal control system for wastewater treatment process", the contents of the above identified applications are herein incorporated by reference in its entirety.

TECHNICAL FIELD

In this present invention, a cooperative optimal control system (COCS) is designed to coordinate the different time-scale performance indices, realize the real-time optimal control of wastewater treatment process (WWTP), and improve the system performance. It is feasible to apply the proposed COCS to the dynamic WWTP, and realize the tracking control of the dissolved oxygen ($S_O$) and the nitrate nitrogen ($S_{NO}$). This system can not only address the cooperative problem of the different performance indices, but also conserve the operation cost, improve the effluent quality, and guarantee the efficient stable operation. The technology of this present invention is a part of advanced manufacturing technologies, which belongs to the field of control engineering and wastewater treatment engineering.

BACKGROUND

WWTP is conducted to effectively adsorb, decompose and oxidize the pollutants based on physical, chemical and biological reactions, so that the pollutants can be degraded and separated from the wastewater, thereby realizing the purification. The efficient operation plays an important role in improving the optimal control performance and optimizing the system performance, which is an important strategy for alleviating scarcity of water resources. It has not only good economic benefits, but also significant environmental and social benefits. Therefore, the research results of the present invention have broad application prospects.

WWTP is a complex industrial system, and it has obvious nonlinearity and time-varying features. In addition, WWTP comprises different dynamic response times and multiple performance evaluation indices, which make it difficult to realize the optimal control. Since the performance indices are conflicting with each other, and influenced by different system response times, how to achieve the cooperation between the performance indices with different time scales is of great significance to improve the system performance and ensure its efficient and stable operation. It is significant to improve the operation performance based on the cooperative performance indices, which can not only improve the optimal operations, but also guarantee the control performance. Therefore, it is necessary to explore a novel optimal control method, where different time-scale performance indices can be formulated, and the optimal set-points of the control variables can be acquired, so that the requirements of the optimal control can be satisfied. Appropriate optimal control method can not only adjust the relationship of the performance indices, so as to guarantee the effluent quality and reduce the operation cost, but also provide suitable dynamic optimal set-points to reduce and cope with the occurrence of the abnormal conditions, and ensure the efficient and stable operation. In addition, by improving the automation level of WWTP, it can also effectively decrease the operation management and operation personnel, as well as minimize the operation cost.

SUMMARY

In this present invention, a COCS is designed for WWTP, where the different time-scale performance indices models are formulated based on the system response time, the different time-scale performance indices models are then optimized by a cooperative optimization algorithm, so that the optimal set-points of $S_O$ and $S_{NO}$ can be obtained, and then a predictive control strategy is designed to trace the obtained optimal set-points of $S_O$ and $S_{NO}$. In this present invention, a COCS is designed. This proposed COCS can address the different time-scale performance indices formulation problem by the two-level performance indices models. It can optimize the multiple time-scale performance indices by the cooperative optimization algorithm based on the data-driven assisted model, so that the problem about the optimal set-points of $S_O$ and $S_{NO}$ can be solved. Moreover, a predictive control strategy is designed to trace the obtained optimal set-points of $S_O$ and $S_{NO}$. Based on COCS, not only the multiobjective optimal control problem can be approached, but also the performance indices can be improved, as well as the efficient and stable operation.

This invention develops a COCS for WWTP. This proposed COCS can solve the problem of description of performance indexes at different time scales by using a two-layer performance index modeling method; and utilize a cooperative optimization algorithm based on a data driven assisted model to solve the problem. The different time-scale performance index models are then optimized by the cooperative optimization algorithm, where the set-points of $S_O$ and the concentration of $S_{NO}$ can be obtained. Then a predictive control strategy is developed to trace the obtained optimal set-points of $S_O$ and $S_{NO}$. Based on the proposed COCS, not only the system performance can be improved, but also efficient and stable operation can be guaranteed.

A cooperative optimal control system is developed for WWTP, its features include the design of system framework and the optimal controller, the specific steps are:

(1) The designed optimal control system contains a center control unit, a blower, an internal flow recycle pump, sensor unit that includes a $S_O$ sensor, two $S_{NO}$ sensors, a suspend solid (SS) sensor, an ammonia nitrogen ($S_{NH}$) sensor, two mixed liquor suspended solids (MLSS) sensors.

The center control unit is used to receive the measured data from the installed sensors, calculate the optimal set-points of the control variables based on the measured data, and generate the control commands to guarantee the operation of WWTP.

Figure 1:
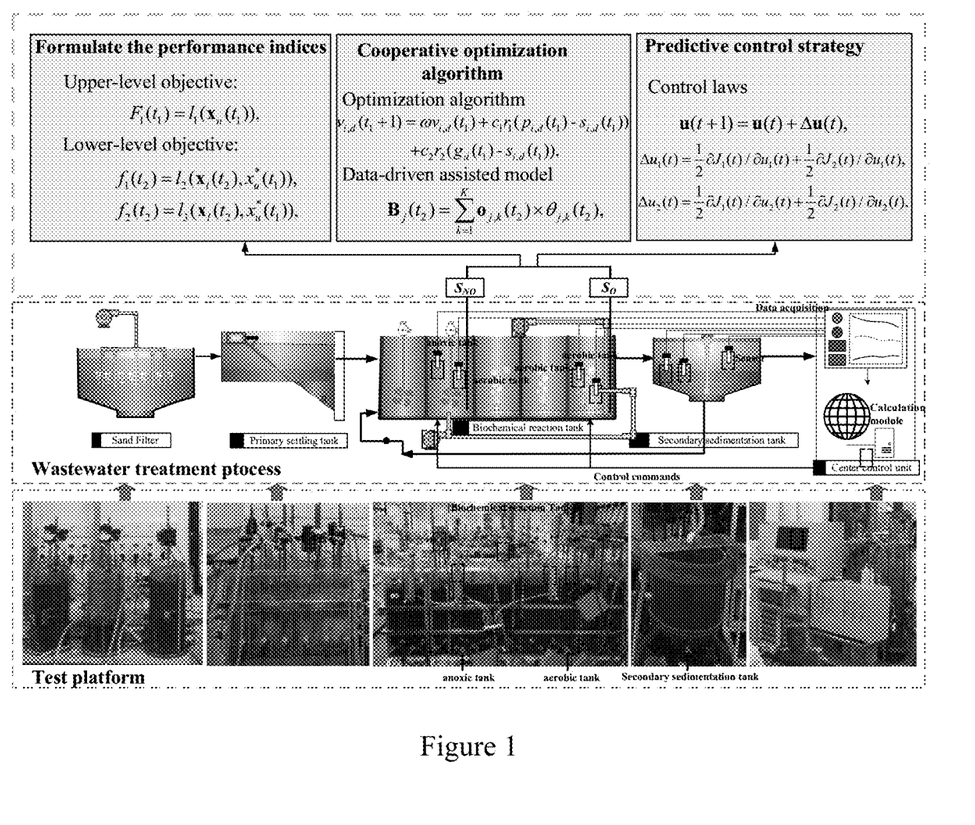
FIG. 1 shows the control system scheme of WWTP.

The blower and the internal flow recycle pump, taken as two important executors of the optimal control system, are applied to perform the control commands transmitted by the center control unit. As shown in FIG. 1, the blower is installed at entrance of the aerobic tank to increase the oxygen content and speed up the treatment process of aerobic bacteria, the internal flow recycle pump is installed below the anoxic tank to increase the mixture reflux. Both the blower and the internal flow recycle pump are communicatively connected to the center control unit to receive control commands from the center control unit.

The sensor unit is used to measure the data of process variables, a $S_O$ sensor, located in the aerobic tank, is configured to measure the values of $S_O$; two $S_{NO}$ sensors, located in the anoxic and secondary sedimentation tanks, are configured to measure the values of $S_{NO}$; a SS sensor, located in the aerobic tank, is configured to measure the values of SS; a $S_{NH}$ sensor, located in the secondary sedimentation tank, is configured to measure the values of $S_{NH}$; two MLSS sensors, located in the anoxic and secondary sedimentation tank, are configured to measure the values of MLSS. All the sensors discussed above are communicatively connected to the center control unit to transmit measured data to the center control unit in real time.

(2) The adaptive calculation of the optimal set-points of control variables, rather than the fixed values by expert experience, the steps are:

1) select the related process variables of the pumping energy (PE), where PE refers to the power consumption caused by internal flow recycle pump: $S_{NO}$, MLSS, and choose the related process variables of the aeration energy (AE), where AE refers to the power consumption caused by blower and the effluent quality (EQ): $S_O$, SS, $S_{NH}$, $S_{NO}$;

2) formulate the two-level models based on the different time scales, the upper-level model is for PE, and the lower-level models are for AE and EQ:

$$F_1(t_1) = l_1(x_u(t_1)), \quad (1)$$

$$f_1(t_2) = l_2(x_l(t_2), x^*_u(t_1)), \quad (2)$$

$$f_2(t_2) = l_3(x_l(t_2), x^*_u(t_1)),$$

where $F_1(t_1)$ is the upper-level model for PE at time $t_1$, $l_1(x_u(t_1))$ is a mapping function of PE model, $f_1(t_2)$ is the lower-level model for AE at time $t_2$, $l_2(x_l(t_2), x^*_u(t_1))$ is a mapping function of AE model, $x^*_u(t_1)$ is optimal set-points of nitrate nitrogen $S_{NO}^*$, $f_2(t_2)$ is the lower-level model for EQ at time $t_2$, $l_3(x_l(t_2), x^*_u(t_1))$ is a mapping function of EQ model, $x_u(t_1)=[S_{NO}(t_1), MLSS(t_1)]$ is input variables vector of PE at time $t_1$, $S_{NO}(t_1)$ is concentration of $S_{NO}$ at time $t_1$, $MLSS(t_1)$ is concentration of MLSS at time $t_1$, and initial values of the two variables are [0.85, 1.56], $x_l(t_2)=[S_O(t_2), SS(t_2), S_{NH}(t_2)]$, $S_O(t_2)$ is concentration of $S_O$ at time $t_2$, $SS(t_2)$ is concentration of SS at time $t_2$, $S_{NH}(t_2)$ is concentration of $S_{NH}$ at time $t_2$, $[S_O(t_2), SS(t_2), S_{NH}(t_2), S_{NO}^*(t_1)]$ is input variables vector of AE and EQ at time $t_2$, and initial values of $[S_O(t_2), SS(t_2), S_{NH}(t_2), S_{NO}^*(t_1)]$ are [1.9, 11.6, 3.8, 0.95];

3) design a cooperative optimization algorithm to optimize the upper-level and lower-level optimization problems for obtaining the optimal set-points of the control variables, where the optimization period in the upper level is 1-3 hours, such as 2 hours, dedicated to the slower process dynamics, in the lower level is 10-50 minutes, such as 3 minutes, dedicated to the faster process dynamics, the steps are:

① formulate the upper-level and lower-level problems:

$$\text{Min} F_1(S_{NO}(t_1), MLSS(t_1)), \quad (3)$$

$$\text{Min}[f_1(S_O(t_2), S_{NH}(t_2), SS(t_2), S_{NO}^*(t_1)), \quad (4)$$

$$f_2(S_O(t_2), S_{NH}(t_2), SS(t_2), S_{NO}^*(t_1))],$$

where Min $F_1(S_{NO}(t_1), MLSS(t_1))$ is the upper-level optimization problem, Min $[f_1(S_O(t_2), S_{NH}(t_2), SS(t_2), S_{NO}^*(t_1)), f_2(S_O(t_2), S_{NH}(t_2), SS(t_2), S_{NO}^*(t_1))]$ is the lower-level optimization problem;

② set the number of the particle population in the upper level optimization $I_1$, the number of the particle population in the lower level optimization $I_2$, the maximum number of iterations in the upper level optimization $N_1$, and the maximum number of iterations in the lower level optimization $N_2$, where $I_1=50$, $I_2=50$, $N_1=20$, $N_2=50$;

③ introduce the single particle swarm optimization (SPSO) algorithm to optimize the upper-level optimization problem, the position and the velocity of the ith particle can be shown as:

$$s_i(t_1) = [s_{i,1}(t_1), s_{i,2}(t_1)], \quad (5)$$

$$v_i(t_1) = [v_{i,1}(t_1), v_{i,2}(t_1)], \quad (6)$$

$s_i(t_1)$ is the position of the ith particle at time $t_1$, $s_{i,1}(t_1)$ is the value of $S_{NO}$ at time $t_1$, $s_{i,2}(t_1)$ is the value of MLSS at time $t_1$, $v_i(t_1)$ is the velocity of the ith particle at time $t_1$, i is the number of particles, $1=1, 2, \ldots, 50$, the update process of $s_i(t_1)$ and $v_i(t_1)$ are $$v_{i,d}(t_1+1) = 0.7 v_{i,d}(t_1) + 0.72(p_{i,d}(t_1) - s_{i,d}(t_1)) + 0.72(g_d(t_1) - s_{i,d}(t_1)), \quad (7)$$

$$s_{i,d}(t_1+1) = s_{i,d}(t_1) + v_{i,d}(t_1+1), \quad (8)$$

where d is the space dimension, $d=1, 2$, $v_{i,d}(t_1)$ is the velocity of the ith particle in the dth dimension at time $t_1$, $p_{i,d}(t_1)$ is the individual optimal solution of the ith particle in the dth dimension at time $t_1$, $g_d(t_1)$ is the global optimal solutions of the ith particle at time $t_1$;

④ if SPSO reaches the preset maximum number of evolutions $N_1$, stop the iterative evolution process, transfer the value of $S_{NO}^*$ to the lower level; if SPSO does not reach the preset maximum number of evolutions $N_1$, return to step ③;

⑤ introduce the multiobjective particle swarm optimization (MOPSO) algorithm to optimize the lower-level optimization problem, the position of the jth particle $a_j(t_2)$ and the velocity of the jth particle $b_j(t_2)$ can be represented as $a_j(t_2)=[a_{j,1}(t_2), a_{j,2}(t_2), a_{j,3}(t_2), a_{j,4}(t_2)]$, $a_{i,1}(t_2)$ represents the value of $S_O$ at time $t_2$, $a_{i,2}(t_2)$ represents the value of $S_{NH}$ at time $t_2$, $a_{i,3}(t_2)$ represents the value of SS at time $t_2$, $a_{i,4}(t_2)$ represents the value of $S_{NO}^*$ at time $t_2$, $b_j(t_2)=[b_{j,1}(t_2), b_{j,2}(t_2), b_{j,3}(t_2), b_{j,4}(t_2)]$, j is the number of particles, $j=1, 2, \ldots, 50$; during the iterative evolution process, the obtained non-dominated solutions are conserved in the external archive $Z(t_2)$, $Z(t_2)=[z_1(t_2), z_2(t_2), \ldots, z_j(t_2), \ldots, z_{50}(t_2)]$, the update rule of the external archive is:

$$\check{z}_j(t_2) = z_j(t_2) + 0.09 \nabla D(z_j(t_2)), \quad (9)$$

where $z_j(t_2)$ is the jth non-dominated solution at time $t_2$ before the archive is updated, $\check{z}_j(t_2)$ is the jth non-dominated solution at time $t_2$ after the archive is updated, $z_j(t_2)=[z_{j,1}(t_2), z_{j,2}(t_2)]$, $\check{z}_j(t_2)=[\check{z}_{j,1}(t_2), \check{z}_{j,2}(t_2)]$, $z_{j,1}(t_2)$ and $\check{z}_{j,1}(t_2)$ are the values of $S_O$ before and after the archive is updated, which are derived by MOPSO algorithm, $z_{j,2}(t_2)$ and $\check{z}_{j,2}(t_2)$ are the values of $S_{NO}$ before and after the archive is updated, which are derived by MOPSO algorithm, VD is the gradient descent direction;

⑥ establish the multi-input-multi-output radial basis assisted model (RBSM) based on the non-dominated solutions in $Z(t_2)$:

$$B_j(t_2) = \sum_{k=1}^{8} o_{j,k}(t_2) \times \theta_{j,k}(t_2), \quad (10)$$

where $B_j(t_2)$ is the output vector of RBSM, $B_j(t_2)=[B_{j,1}(t_2), B_{j,2}(t_2)]^T$, $B_{j,1}(t_2)$ is the predicted value of the aeration energy at time $t_2$, $B_{j,2}(t_2)$ is the predicted value of the effluent quality at time $t_2$, $o_j(t_2)=[o_{j,1}(t_2), o_{j,2}(t_2), \ldots, o_{j,8}(t_2)]^T$ are the connection weights, $\theta_j(t_2)=[\theta_{j,1}(t_2), \theta_{j,2}(t_2), \ldots, \theta_{j,8}(t_2)]^T$ is the output vector of the neurons in hidden layer, the sum of the squared errors between the output of RBSM and the actual system is expressed as $$e(z_n(t_2)) = \min(B_n(t_2) - Q(t_2))^T (B_n(t_2) - Q(t_2)), \quad (11)$$

where $e(z_n(t_2))$ is the sum of the squared errors between the outputs of nth non-dominated solution $B_n(t_2)$ and the actual system $Q(t_2)$, $n \in [1, 50]$, $Q(t_2)=[Q_1(t_2), Q_2(t_2)]$ is the real outputs of AE and EQ in the actual system that obtained by electricity meter and the sensors in real time, select the solution corresponding to the minimal sum of the squared error as the global optimal solution;

⑦ if MOPSO reaches the preset maximum number of evolutions $N_2$, stop the iterative evolution process and output the optimal set-points of dissolved oxygen $S_O^*$; if MOPSO does not reach the preset maximum number of evolutions $N_2$, return to step ⑤; then the optimal set-points of $S_{NO}^*$ and $S_O^*$ can be obtained.

(3) Perform the control commands. If the measured value of $S_{NO}$ is lower or higher than $S_{NO}^*$, it is noted that the internal recycle flow in anoxic tank should be adjusted to satisfy the operating requirement by manipulating the electromagnetic valve of the internal flow recycle pump. Specifically, the signal or data of the measured value of $S_{NO}$ can be transmitted to the center control unit in real time, and the center control unit compares the measured value of $S_{NO}$ with $S_{NO}^*$, and then sends a command to the internal flow recycle pump to control its electromagnetic valve in real time. If the measured value of $S_O$ is lower or higher than $S_O^*$, it is noted that the supplied oxygen should be adjusted by manipulating the fan frequency of the blower. Specifically, the signal or data of the measured value of $S_O$ can be transmitted to the center control unit in real time, and the center control unit compares the measured value of $S_O$ with $S_O^*$, and then sends a command to the blower to control its fan frequency in real time. The detailed adjusting strategy is realized by the predictive control. The steps are:

① define the cost functions in the predictive control strategy:

$$J_1(t) = \frac{1}{2}\sum_{q=1}^{5}(z_1(t) - y_1(t))^2 + \frac{1}{2}\sum_{m=1}^{4}\Delta u(t)^T \Delta u(t), \quad (12)$$

$$J_2(t) = \frac{1}{2}\sum_{q=1}^{5}(z_2(t) - y_2(t))^2 + \frac{1}{2}\sum_{m=1}^{4}\Delta u(t)^T \Delta u(t),$$

where $z_1(t)$ and $z_2(t)$ are the optimal set-points of $S_O^*$ and $S_{NO}^*$, $y_1(t)$ and $y_2(t)$ are the predicted values of $S_O$ and $S_{NO}$;

② update the control laws based on the predictive control strategy, the updated rule is:

$$u(t+1) = u(t) + \Delta u(t), \quad (13)$$

where u(t) is the control law at time t, $\Delta u(t)$ are the control variations, whose expressions are shown as:

$$\Delta u_1(t) = \frac{1}{2}\partial J_1(t)/\partial u_1(t) + \frac{1}{2}\partial J_2(t)/\partial u_1(t), \quad (14)$$

$$\Delta u_2(t) = \frac{1}{2}\partial J_1(t)/\partial u_2(t) + \frac{1}{2}\partial J_2(t)/\partial u_2(t),$$

where $\Delta u(t)$ are the variations of the manipulated variables electromagnetic valve of the internal flow recycle pump and the fan frequency of the blower, $\Delta u(t)=[\Delta u_1(t), \Delta u_2(t)]$. The values of $S_O$ and $S_{NO}$ will be changed accordingly, and then transmitted to the center control unit to realize the optimal control. The effects of the proposed optimal control results are reflected by the daily average of PE value, the daily average of AE value, the daily average of EQ value, and the tracking control results of $S_O$ and $S_{NO}$, as shown in FIGS. 2-6.

The center control unit includes at least a processor and a memory communicatively connected to the processor. The memory stores instructions executable by the processor, and the instructions are executed by the processor to carry out the above discussed data collecting, modeling, and parameter adjusting steps described above.

The Novelties of this Present Disclosure Contain:

(1) Since WWTP is a complex and dynamic biochemical reaction process, conflicts with coupling performance indices, it is necessary to coordinate the performance indices in this present invention, and then improve the system performance, as well as guarantee the efficient and stable operation. However, due to the nonlinearity, strong coupling feature, and the conflicted multiple time-scale performance indices, it is difficult to realize the optimal control in WWTP. According to the operation features, a COCS method based on the cooperation optimization algorithm and predictive control strategy is proposed, which can balance the coupling performance indices and improve the operation efficiency.

(2) In this present invention, a COCS based on the cooperation optimization algorithm and predictive control strategy is studied to realize the optimal control in WWTP. This proposed optimal control method can efficiently capture the dynamic features of the performance indices, and acquire the optimal set-points of $S_O$ and $S_{NO}$ based on the dynamic working scenarios. Moreover, this proposed COCS can improve the optimization indices, and optimize the control performance.

Attention: for the convenient description, a data-driven assisted model based cooperative optimization algorithm and a predictive control strategy are used to describe and optimize the performance index, and trace the optimal set-points of $S_O$ and $S_{NO}$. The other optimal control methods based on different optimization algorithm and control strategy also belong to the scope of this present invention.

BRIEF DESCRIPTION OF THE DRAWINGS

FIG. 5 includes FIG. 5(a) and FIG. 5(b), and shows the results of $S_O$ in COCS.

DETAILED DESCRIPTION

The system shown in FIG. 1 includes a sand filter for filtering out sand and other particles contained in the wastewater to be treated. Connected to the sand filter is a primary settling tank for settling filtered wastewater. The wastewater output from the primary settling tank is sent to a biochemical reaction tank to oxide and decompose the organic matters. After reaction in a biochemical reaction tank, the wastewater is introduced into a secondary sedimentation tank, after sedimentation treatment, the wastewater is discharged to complete the wastewater treatment.

1. The design of the cooperative optimal control system for WWTP, the steps are:

(1) The designed optimal control system contains the center control unit, blower, internal flow recycle pump, sensor unit that includes a $S_O$ sensor, two $S_{NO}$ sensors, a SS sensor, a $S_{NH}$ sensor, two MLSS sensors.

The center control unit is used to receive the measured data from the installed sensors, calculate the optimal set-points of the control variables based on the measured data, and generate the control commands to guarantee the operation of WWTP. The blower and internal flow recycle pump are applied to perform the control commands transmitted by the center control unit. The sensor unit is used to measure the data of process variables, a $S_O$ sensor, located in the aerobic tank, is configured to measure the values of $S_O$; two $S_{NO}$ sensors, located in the anoxic and secondary sedimentation tanks, are configured to measure the values of $S_{NO}$; a SS sensor, located in the aerobic tank, is configured to measure the values of SS; a $S_{NH}$ sensor, located in the secondary sedimentation tank, is configured to measure the values of $S_{NH}$; two MLSS sensors, located in the anoxic and secondary sedimentation tank, are configured to measure the values of MLSS.

(2) The adaptive calculation of the optimal set-points of control variables, rather than the fixed values by expert experience, the steps are:

1) select the related process variables of PE: $S_{NO}$, MLSS, and choose the related process variables of AE and EQ: $S_O$, SS, $S_{NH}$, $S_{NO}$;

2) formulate the two-level models based on the different time scales, the upper-level model is for PE, and the lower-level models are for AE and EQ:

$$F_1(t_1) = l_1(x_u(t_1)), \quad (1)$$

$$f_1(t_2) = l_2(x_l(t_2), x_u^*(t_1)), \quad (2)$$

$$f_2(t_2) = l_3(x_l(t_2), x_u^*(t_1)),$$

where $F_1(t_1)$ is the upper-level model for PE at time $t_1$, $l_1(x_u(t_1))$ is a mapping function of PE model, $f_1(t_2)$ is the lower-level model for AE at time $t_2$, $l_2(x_l(t_2), x^*_u(t_1))$ is a mapping function of AE model, $x^*_u(t_1)$ is optimal set-points of nitrate nitrogen $S_{NO}^*$, $f_2(t_2)$ is the lower-level model for EQ at time $t_2$, $l_3(x_l(t_2), x^*_u(t_1))$ is a mapping function of EQ model, $x_u(t_1)=[S_{NO}(t_1), MLSS(t_1)]$ is input variables vector of PE at time $t_1$, $S_{NO}(t_1)$ is concentration of $S_{NO}$ at time $t_1$, MLSS($t_1$) is concentration of MLSS at time $t_1$, and initial values of the two variables are [0.85, 1.56], $x_l(t_2)=[S_O(t_2), SS(t_2), S_{NH}(t_2)]$, $S_O(t_2)$ is concentration of $S_O$ at time $t_2$, SS($t_2$) is concentration of SS at time $t_2$, $S_{NH}(t_2)$ is concentration of $S_{NH}$ at time $t_2$, [$S_O(t_2)$, SS($t_2$), $S_{NH}(t_2)$, $S_{NO}^*(t_1)$] is input variables vector of AE and EQ at time $t_2$, and initial values of [$S_O(t_2)$, SS($t_2$), $S_{NH}(t_2)$, $S_{NO}^*(t_1)$] are [1.9, 11.6, 3.8, 0.95];

3) design a cooperative optimization algorithm to optimize the upper-level and lower-level optimization problems for obtaining the optimal set-points of the control variables, where the optimization period in the upper level is 1-3 hours, such as 2 hours, dedicated to the slower process dynamics, in the lower level is 10-50 minutes, such as 30 minutes, dedicated to the faster process dynamics, the steps are:

① formulate the upper-level and lower-level problems:

$$\mathrm{Min} F_1(S_{NO}(t_1), MLSS(t_1)), \quad (3)$$

$$\mathrm{Min}[f_1(S_O(t_2), S_{NH}(t_2), SS(t_2), S_{NO}^*(t_1)), \quad (4)$$

$$f_2(S_O(t_2), S_{NH}(t_2), SS(t_2), S_{NO}^*(t_1))],$$

where Min $F_1(S_{NO}(t_1), MLSS(t_1))$ is the upper-level optimization problem, Min [$f_1(S_O(t_2), S_{NH}(t_2), SS(t_2), S_{NO}^*(t_1))$, $f_2(S_O(t_2), S_{NH}(t_2), SS(t_2), S_{NO}^*(t_1))$] is the lower-level optimization problem;

② set the number of the particle population in the upper level optimization $I_1$, the number of the particle population in the lower level optimization $I_2$, the maximum number of iterations in the upper level optimization $N_1$, and the maximum number of iterations in the lower level optimization $N_2$, where $I_1=50$, $I_2=50$, $N_1=20$, $N_2=50$;

③ introduce the single particle swarm optimization (SPSO) algorithm to optimize the upper-level optimization problem, the position and the velocity of the ith particle can be shown as:

$$s_i(t_1) = [s_{i,1}(t_1), s_{i,2}(t_1)], \quad (5)$$

$$v_i(t_1) = [v_{i,1}(t_1), v_{i,2}(t_1)], \quad (6)$$

$s_i(t_1)$ is the position of the ith particle at time $t_1$, $s_{i,1}(t_1)$ is the value of $S_{NO}$ at time $t_1$, $s_{i,2}(t_1)$ is the value of MLSS at time $t_1$, $v_i(t_1)$ is the velocity of the ith particle at time $t_1$, i is the number of particles, i=1, 2, ..., 50, the update process of $s_i(t_1)$ and $v_i(t_1)$ are $$v_{i,d}(t_1 + 1) = \quad (7)$$
$$0.7 v_{i,d}(t_1) + 0.72(p_{i,d}(t_1) - s_{i,d}(t_1)) + 0.72(g_d(t_1) - s_{i,d}(t_1)),$$

$$s_{i,d}(t_1 + 1) = s_{i,d}(t_1) + v_{i,d}(t_1 + 1), \quad (8)$$

where d is the space dimension, d=1, 2, $v_{i,d}(t_1)$ is the velocity of the ith particle in the dth dimension at time $t_1$, $p_{i,d}(t_1)$ is the individual optimal solution of the ith particle in the dth dimension at time $t_1$, $g_d(t_1)$ is the global optimal solutions of the ith particle at time $t_1$;

④ if SPSO reaches the preset maximum number of evolutions $N_1$, stop the iterative evolution process, transfer the value of $S_{NO}^*$ to the lower level; if SPSO does not reach the preset maximum number of evolutions $N_1$, return to step ③;

⑤ introduce the multiobjective particle swarm optimization (MOPSO) algorithm to optimize the lower-level optimization problem, the position of the jth particle $a_j(t_2)$ and the velocity of the jth particle $b_j(t_2)$ can be represented as $a_j(t_2)=[a_{j,1}(t_2), a_{j,2}(t_2), a_{j,3}(t_2), a_{j,4}(t_2)]$, $a_{j,1}(t_2)$ represents the value of $S_O$ at time $t_2$, $a_{j,2}(t_2)$ represents the value of $S_{NH}$ at time $t_2$, $a_{j,3}(t_2)$ represents the value of SS at time $t_2$, $a_{j,4}(t_2)$ represents the value of $S_{NO}^*$ at time $t_2$, $b_j(t_2)=[b_{j,1}(t_2), b_{j,2}(t_2), b_{j,3}(t_2), b_{j,4}(t_2)]$, j is the number of particles, j=1, 2, ..., 50; during the iterative evolution process, the obtained non-dominated solutions are conserved in the external archive $Z(t_2)$, $Z(t_2)=[z_1(t_2), z_2(t_2), \ldots, z_j(t_2), \ldots, z_{50}(t_2)]$, the update rule of the external archive is:

$$\check{z}_j(t_2) = z_j(t_2) + 0.09 \nabla D(z_j(t_2)), \tag{9}$$

where $z_j(t_2)$ is the jth non-dominated solution at time $t_2$ before the archive is updated, $\check{z}_j(t_2)$ is the jth non-dominated solution at time $t_2$ after the archive is updated, $z_j(t_2)=[z_{j,1}(t_2), z_{j,2}(t_2)]$, $\check{z}_j(t_2)=[\check{z}_{j,1}(t_2), \check{z}_{j,2}(t_2)]$, $z_{j,1}(t_2)$ and $\check{z}_{j,1}(t_2)$ are the values of $S_O$ before and after the archive is updated, which are derived by MOPSO algorithm, $z_{j,2}(t_2)$ and $\check{z}_{j,2}(t_2)$ are the values of $S_{NO}$ before and after the archive is updated, which are derived by MOPSO algorithm, VD is the gradient descent direction;

⑥ establish the multi-input-multi-output radial basis assisted model (RBSM) based on the non-dominated solutions in $Z(t_2)$:

$$B_j(t_2) = \sum_{k=1}^{8} o_{j,k}(t_2) \times \theta_{j,k}(t_2), \tag{10}$$

where $B_j(t_2)$ is the output vector of RBSM, $B_j(t_2)=[B_{j,1}(t_2), B_{j,2}(t_2)]^T$, $B_{j,1}(t_2)$ is the predicted value of the aeration energy at time $t_2$, $B_{j,2}(t_2)$ is the predicted value of the effluent quality at time $t_2$, $o_j(t_2)=[o_{j,1}(t_2), o_{j,2}(t_2), \ldots, o_{j,8}(t_2)]^T$ are the connection weights, $\theta_j(t_2)=[\theta_{j,1}(t_2), \theta_{j,2}(t_2), \ldots, \theta_{j,8}(t_2)]^T$ is the output vector of the neurons in hidden layer, the sum of the squared errors between the output of RBSM and the actual system is expressed as $$e(z_n(t_2)) = \min(B_n(t_2) - Q(t_2))^T (B_n(t_2) - Q(t_2)), \tag{11}$$

where $e(z_n(t_2))$ is the sum of the squared errors between the outputs of nth non-dominated solution $B_n(t_2)$ and the actual system $Q(t_2)$, $n \in [1, 50]$, $Q(t_2)=[Q_1(t_2), Q_2(t_2)]$ is the real outputs of AE and EQ in the actual system that obtained by electricity meter and the sensors in real time, select the solution corresponding to the minimal sum of the squared error as the global optimal solution;

⑦ if MOPSO reaches the preset maximum number of evolutions $N_2$, stop the iterative evolution process and output the optimal set-points of dissolved oxygen $S_O^*$; if MOPSO does not reach the preset maximum number of evolutions $N_2$, return to step ⑤; then the optimal set-points of $S_{NO}^*$ and $S_O^*$ can be obtained.

(3) Perform the control commands. If the measured value of $S_{NO}$ is lower or higher than $S_{NO}^*$, it is noted that the internal recycle flow in anoxic tank should be adjusted to satisfy the operating requirement by manipulating the electromagnetic valve of the internal flow recycle pump. Specifically, the signal or data of the measured value of $S_{NO}$ can be transmitted to the center control unit in real time, and the center control unit compares the measured value of $S_{NO}$ with $S_{NO}^*$, and then sends a command to the internal flow recycle pump to control its electromagnetic valve in real time. If the measured value of $S_O$ is lower or higher than $S_O^*$, it is noted that the supplied oxygen should be adjusted by manipulating the fan frequency of the blower. Specifically, the signal or data of the measured value of $S_O$ can be transmitted to the center control unit in real time, and the center control unit compares the measured value of $S_O$ with $S_O^*$, and then sends a command to the blower to control its fan frequency in real time. The detailed adjusting strategy is realized by the predictive control. The steps are:

① define the cost functions in the predictive control strategy:

$$J_1(t) = \frac{1}{2}\sum_{q=1}^{5}(z_1(t) - y_1(t))^2 + \frac{1}{2}\sum_{m=1}^{4}\Delta u(t)^T \Delta u(t), \tag{12}$$

$$J_2(t) = \frac{1}{2}\sum_{q=1}^{5}(z_2(t) - y_2(t))^2 + \frac{1}{2}\sum_{m=1}^{4}\Delta u(t)^T \Delta u(t),$$

where $z_1(t)$ and $z_2(t)$ are the optimal set-points of $S_O^*$ and $S_{NO}^*$, $y_1(t)$ and $y_2(t)$ are the predicted values of $S_O$ and $S_{NO}$;

② update the control laws based on the predictive control strategy, the updated rule is:

$$u(t+1) = u(t) + \Delta u(t), \tag{13}$$

where $u(t)$ is the control law at time $t$, $\Delta u(t)$ are the control variations, whose expressions are shown as:

$$\Delta u_1(t) = \frac{1}{2}\partial J_1(t)/\partial u_1(t) + \frac{1}{2}\partial J_2(t)/\partial u_1(t), \tag{14}$$

$$\Delta u_2(t) = \frac{1}{2}\partial J_1(t)/\partial u_2(t) + \frac{1}{2}\partial J_2(t)/\partial u_2(t),$$

where $\Delta u(t)$ are the variations of the manipulated variables electromagnetic valve of internal flow recycle pump and the fan frequency of blower, $\Delta u(t)=[\Delta u_1(t), \Delta u_2(t)]$. The values of $S_O$ and $S_{NO}$ will be changed accordingly, and then transmitted to the center control unit to realize the optimal control. The effects of the proposed optimal control results are reflected by the daily average of PE value, the daily average of AE value, the daily average of EQ value, and the tracking control results of $S_O$ and $S_{NO}$.

Figure 2:
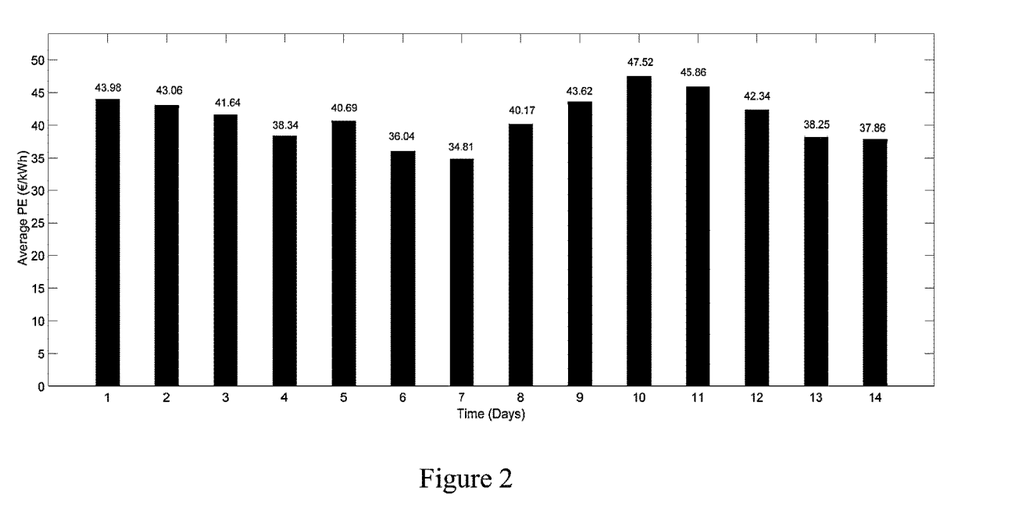
FIG. 2 shows the results of PE in COCS.
Figure 3:
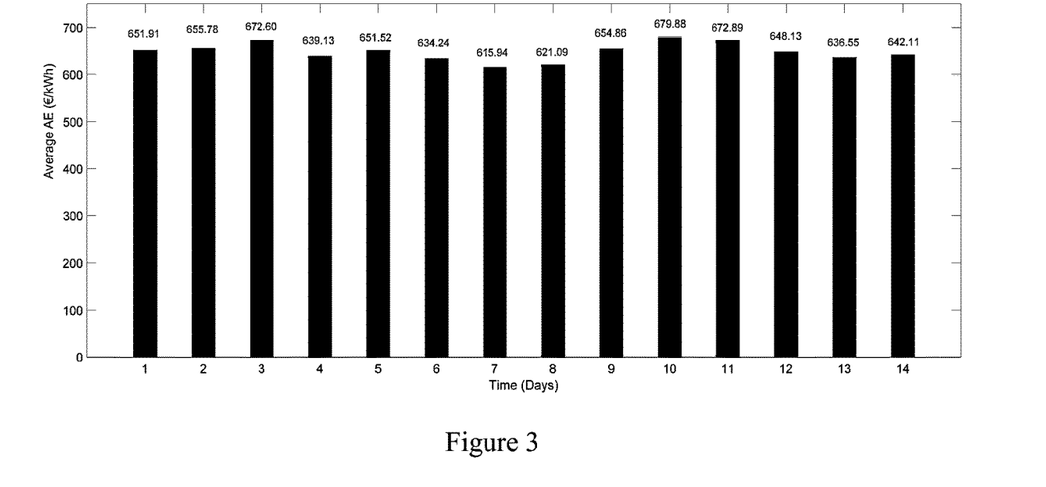
FIG. 3 shows the results of AE in COCS.
Figure 4:
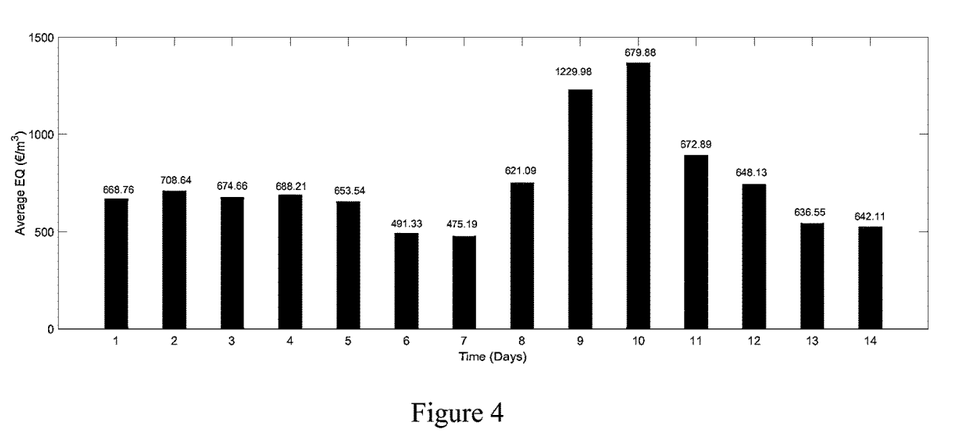
FIG. 4 shows the results of EQ in COCS.
Figures 5, 5A, 5B:
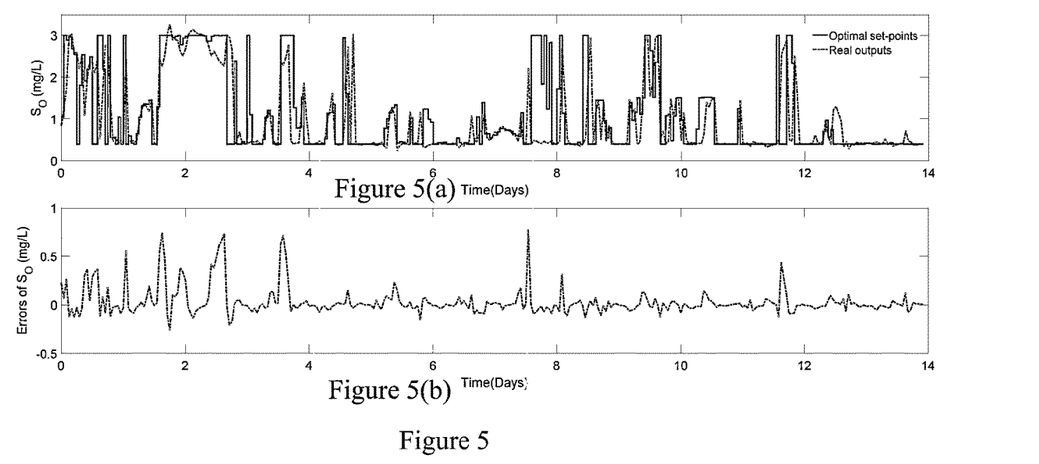
Figure 6:
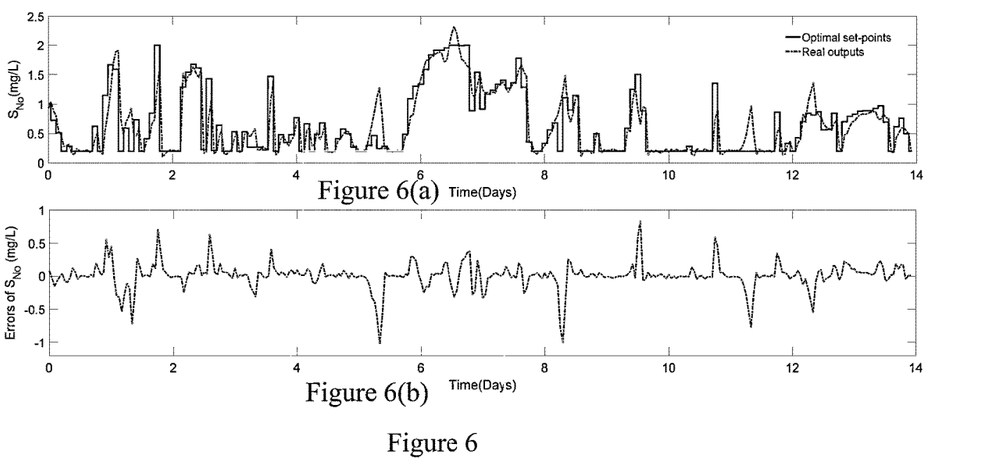
FIG. 6 includes FIG. 6(a) and FIG. 6(b), and shows the results of $S_{NO}$ in COCS.

The control system scheme based on COCS is shown in FIG. 1, and the optimal control results are presented in FIGS. 2-6. FIG. 2 gives the daily average PE values, X axis shows the time, and the unit is day, Y axis is the average PE value, and the unit is €/KWh. FIG. 3 gives the daily average AE values, X axis shows the time, and the unit is day, Y axis is the average AE value, and the unit is €/KWh. FIG. 4 gives the daily average EQ values, X axis shows the time, and the unit is day, Y axis is the average EQ value, and the unit is €/m³. FIG. 5(a) gives $S_O$ values, X axis shows the time, and the unit is day, Y axis is control results of $S_O$, and the unit is mg/L. FIG. 5(b) gives the control errors of $S_O$, X axis shows the time, and the unit is day, Y axis is control errors of $S_O$, and the unit is mg/L. FIG. 6(a) gives the $S_{NO}$ values, X axis shows the time, and the unit is day, Y axis is control results of $S_{NO}$, and the unit is mg/L. FIG. 6(b) gives the control errors of $S_{NO}$, X axis shows the time, and the unit is day, Y axis is control errors of $S_{NO}$, and the unit is mg/L.

The invention claimed is:

1. A method of designing a cooperative optimal control system for WWTP, comprising the steps:
   (1) providing an optimal control system that contains a center control unit, a blower, an internal flow recycle pump, sensor unit that includes a $S_O$ sensor, two $S_{NO}$ sensors, a SS sensor, a $S_{NH}$ sensor, two MLSS sensors;

the center control unit is configured to receive measured data from the sensor unit, calculate optimal set-points of control variables based on the measured data, and generate control commands to optimize operation of the WWTP;

the blower and the internal flow recycle pump are applied to perform the control commands transmitted by the center control unit;

the sensor unit is used to measure data of process variables, the $S_O$ sensor, located in the aerobic tank, is configured to measure values of $S_O$; the two $S_{NO}$ sensors, located in the anoxic and secondary sedimentation tanks, are configured to measure values of $S_{NO}$; the SS sensor, located in the aerobic tank, is configured to measure values of SS; the $S_{NH}$ sensor, located in the secondary sedimentation tank, is configured to measure values of $S_{NH}$; the two MLSS sensors, located in the anoxic and secondary sedimentation tank, are configured to measure values of MLSS;

(2) adaptive calculation of the optimal set-points of control variables, rather than the fixed values by expert experience, the steps are:

1) select related process variables of PE: $S_{NO}$, MLSS, and choose related process variables of AE and EQ: $S_O$, SS, $S_{NH}$, $S_{NO}$;

2) formulate two-level models based on different time scales, an upper-level model is for PE, and lower-level models are for AE and EQ:

$$F_1(t_1) = l_1(x_u(t_1)), \quad (1)$$

$$f_1(t_2) = l_2(x_l(t_2), x_u^*(t_1)), \quad (2)$$
$$f_2(t_2) = l_3(x_l(t_2), x_u^*(t_1)),$$

where $F_1(t_1)$ is the upper-level model for PE at time $t_1$, $l_1(x_u(t_1))$ is a mapping function of PE model, $f_1(t_2)$ is the lower-level model for AE at time $t_2$, $l_2(x_l(t_2), x_u^*(t_1))$ is a mapping function of AE model, $x_u^*(t_1)$ is optimal set-points of nitrate nitrogen $S_{NO}^*$, $f_2(t_2)$ is the lower-level model for EQ at time $t_2$, $l_3(x_l(t_2), x_u^*(t_1))$ is a mapping function of EQ model, $x_u(t_1)=[S_{NO}(t_1), MLSS(t_1)]$ is input variables vector of PE at time $t_1$, $S_{NO}(t_1)$ is concentration of $S_{NO}$ at time $t_1$, $MLSS(t_1)$ is concentration of MLSS at time $t_1$, and initial values of the two variables are [0.85, 1.56], $x_l(t_2)=[S_O(t_2), SS(t_2), S_{NH}(t_2)]$, $S_O(t_2)$ is concentration of $S_O$ at time $t_2$, $SS(t_2)$ is concentration of SS at time $t_2$, $S_{NH}(t_2)$ is concentration of $S_{NH}$ at time $t_2$, $[S_O(t_2), SS(t_2), S_{NH}(t_2), S_{NO}^*(t_1)]$ is input variables vector of AE and EQ at time $t_2$, and initial values of $[S_O(t_2), SS(t_2), S_{NH}(t_2), S_{NO}^*(t_1)]$ are [1.9, 11.6, 3.8, 0.95];

3) design a cooperative optimization algorithm to optimize the upper-level and lower-level optimization problems for obtaining the optimal set-points of the control variables, where the optimization period in the upper level is 1-3 hours dedicated to the slower process dynamics, in the lower level is 10-50 minutes dedicated to the faster process dynamics, the steps are:

① formulate the upper-level and lower-level problems:

$$\text{Min} F_1(S_{NO}(t_1), MLSS(t_1)), \quad (3)$$

$$\text{Min}[f_1(S_O(t_2), S_{NH}(t_2), SS(t_2), S_{NO}^*(t_1)), \quad (4)$$
$$f_2(S_O(t_2), S_{NH}(t_2), SS(t_2), S_{NO}^*(t_1))],$$

where Min $F_1(S_{NO}(t_1), MLSS(t_1))$ is the upper-level optimization problem, Min $[f_1(S_O(t_2), S_{NH}(t_2), SS(t_2), S_{NO}^*(t_1)), f_2(S_O(t_2), S_{NH}(t_2), SS(t_2), S_{NO}^*(t_1))]$ is the lower-level optimization problem;

② set the number of the particle population in the upper level optimization $I_1$, the number of the particle population in the lower level optimization $I_2$, the maximum number of iterations in the upper level optimization $N_1$, and the maximum number of iterations in the lower level optimization $N_2$, where $I_1=50$, $I_2=50$, $N_1=20$, $N_2=50$;

③ introduce the single particle swarm optimization (SPSO) algorithm to optimize the upper-level optimization problem, the position and the velocity of the ith particle can be shown as:

$$s_i(t_1) = [s_{i,1}(t_1), s_{i,2}(t_1)], \quad (5)$$

$$v_i(t_1) = [v_{i,1}(t_1), v_{i,2}(t_1)], \quad (6)$$

$s_i(t_1)$ is the position of the ith particle at time $t_1$, $s_{i,1}(t_1)$ is the value of $S_{NO}$ at time $t_1$, $s_{i,2}(t_1)$ is the value of MLSS at time $t_1$, $v_i(t_1)$ is the velocity of the ith particle at time $t_1$, i is the number of particles, $I=1, 2, \ldots, 50$, the update process of $s_i(t_1)$ and $v_i(t_1)$ are $$v_{i,d}(t_1 + 1) = \quad (7)$$
$$0.7 v_{i,d}(t_1) + 0.72(p_{i,d}(t_1) - s_{i,d}(t_1)) + 0.72(g_d(t_1) - s_{i,d}(t_1)),$$

$$s_{i,d}(t_1 + 1) = s_{i,d}(t_1) + v_{i,d}(t_1 + 1), \quad (8)$$

where d is the space dimension, $d=1, 2$, $v_{i,d}(t_1)$ is the velocity of the ith particle in the dth dimension at time $t_1$, $p_{i,d}(t_1)$ is the individual optimal solution of the ith particle in the dth dimension at time $t_1$, $g_d(t_1)$ is the global optimal solutions of the ith particle at time $t_1$;

④ if SPSO reaches the preset maximum number of evolutions $N_1$, stop the iterative evolution process, transfer the value of $S_{NO}^*$ to the lower level; if SPSO does not reach the preset maximum number of evolutions $N_1$, return to step ③;

⑤ introduce the multiobjective particle swarm optimization (MOPSO) algorithm to optimize the lower-level optimization problem, the position of the jth particle $a_j(t_2)$ and the velocity of the jth particle $b_j(t_2)$ can be represented as $a_j(t_2)=[a_{j,1}(t_2), a_{j,2}(t_2), a_{j,3}(t_2), a_{j,4}(t_2)]$, $a_{i,1}(t_2)$ represents the value of $S_O$ at time $t_2$, $a_{i,2}(t_2)$ represents the value of $S_{NH}$ at time $t_2$, $a_{i,3}(t_2)$ represents the value of SS at time $t_2$, $a_{i,4}(t_2)$ represents the value of $S_{NO}^*$ at time $t_2$, $b_j(t_2)=[b_{j,1}(t_2), b_{j,2}(t_2), b_{j,3}(t_2), b_{j,4}(t_2)]$, j is the number of particles, $j=1, 2, \ldots, 50$; during the iterative evolution process, the obtained non-dominated solutions are conserved in the external archive $Z(t_2)$, $Z(t_2)=[z_1(t_2), z_2(t_2), \ldots, z_j(t_2), \ldots, z_{50}(t_2)]$, the update rule of the external archive is:

$$\check{z}_j(t_2) = z_j(t_2) + 0.09 \nabla D(z_j(t_2)), \quad (9)$$

where $z_j(t_2)$ is the jth non-dominated solution at time $t_2$ before the archive is updated, $\check{z}_j(t_2)$ is the jth non-dominated solution at time $t_2$ after the archive is updated, $z_j(t_2)=[z_{j,1}(t_2), z_{j,2}(t_2)]$, $\check{z}_j(t_2)=[\check{z}_{j,1}(t_2), \check{z}_{j,2}(t_2)]$, $z_{j,1}(t_2)$ and $\check{z}_{j,1}(t_2)$ are the values of $S_O$ before and after the archive is updated, $z_{j,2}(t_2)$ and $\check{z}_{j,2}(t_2)$ are the values of $S_{NO}$ before and after the archive is updated, $\nabla D$ is the gradient descent direction;

⑥ establish the multi-input-multi-output radial basis assisted model (RBSM) based on the non-dominated solutions in $Z(t_2)$:

$$B_j(t_2) = \sum_{k=1}^{8} o_{j,k}(t_2) \times \theta_{j,k}(t_2), \qquad (10)$$

where $B_j(t_2)$ is the output vector of RBSM, $B_j(t_2)=[B_{j,1}(t_2), B_{j,2}(t_2)]^T$, $B_{j,1}(t_2)$ is the predicted value of the aeration energy at time $t_2$, $B_{j,2}(t_2)$ is the predicted value of the effluent quality at time $t_2$, $o_j(t_2)=[o_{j,1}(t_2), o_{j,2}(t_2), \ldots, o_{j,8}(t_2)]^T$ are the connection weights, $\theta_j(t_2)=[\theta_{j,1}(t_2), \theta_{j,2}(t_2), \ldots, \theta_{j,8}(t_2)]^T$ is the output vector of the neurons in hidden layer, the sum of the squared errors between the output of RBSM and the actual system is expressed as $$e(z_n(t_2)) = \min(B_n(t_2) - Q(t_2))^T (B_n(t_2) - Q(t_2)), \qquad (11)$$

where $e(z_n(t_2))$ is the sum of the squared errors between the outputs of nth non-dominated solution $B_n(t_2)$ and the actual system $Q(t_2)$, $n \in [1, 50]$, $Q(t_2)=[Q_1(t_2), Q_2(t_2)]$ is the real outputs of AE and EQ in the actual system, select the solution corresponding to the minimal sum of the squared error as the global optimal solution;

⑦ if MOPSO reaches the preset maximum number of evolutions $N_2$, stop the iterative evolution process and output the optimal set-points of dissolved oxygen $S_O{}^*$; if MOPSO does not reach the preset maximum number of evolutions $N_2$, return to step ⑤; then the optimal set-points of $S_{NO}{}^*$ and $S_O{}^*$ can be obtained;

(3) perform the control commands: if the measured value of $S_{NO}$ is lower or higher than $S_{NO}{}^*$, it is noted that the internal recycle flow should be adjusted to satisfy the operating requirement by manipulating the electromagnetic valve of internal flow recycle pump; if the measured value of $S_O$ is lower or higher than $S_O{}^*$, it is noted that the supplied oxygen should be adjusted by manipulating the fan frequency of blower; the detailed adjusting strategy is realized by the predictive control; the steps are:

① define the cost functions in the predictive control strategy:

$$J_1(t) = \frac{1}{2}\sum_{q=1}^{5}(z_1(t)-y_1(t))^2 + \frac{1}{2}\sum_{m=1}^{4}\Delta u(t)^T \Delta u(t), \qquad (12)$$

$$J_2(t) = \frac{1}{2}\sum_{q=1}^{5}(z_2(t)-y_2(t))^2 + \frac{1}{2}\sum_{m=1}^{4}\Delta u(t)^T \Delta u(t),$$

where $z_1(t)$ and $z_2(t)$ are the optimal set-points of $S_O{}^*$ and $S_{NO}{}^*$, $y_1(t)$ and $y_2(t)$ are the predicted values of $S_O$ and $S_{NO}$;

② update the control laws based on the predictive control strategy, the updated rule is:

$$u(t+1) = u(t) + \Delta u(t), \qquad (13)$$

where $u(t)$ is the control law at time $t$, $\Delta u(t)$ are the control variations, whose expressions are shown as:

$$\Delta u_1(t) = \frac{1}{2}\partial J_1(t)/\partial u_1(t) + \frac{1}{2}\partial J_2(t)/\partial u_1(t), \qquad (14)$$

$$\Delta u_2(t) = \frac{1}{2}\partial J_1(t)/\partial u_2(t) + \frac{1}{2}\partial J_2(t)/\partial u_2(t),$$

where $\Delta u(t)$ are the variations of the manipulated variables electromagnetic valve of internal flow recycle pump and the fan frequency of blower, $\Delta u(t)=[\Delta u_1(t), \Delta u_2(t)]$; the values of $S_O$ and $S_{NO}$ will be changed accordingly, and then transmitted to the center control unit to realize the optimal control; the effects of the proposed optimal control results are reflected by the daily average of PE value, the daily average of AE value, the daily average of EQ value, and the tracking control results of $S_O$ and $S_{NO}$.

\* \* \* \* \*